(12) United States Patent
Meyer et al.

(10) Patent No.: US 7,134,301 B2
(45) Date of Patent: Nov. 14, 2006

(54) MOLD SUPPORT MECHANISM FOR AN I.S. MACHINE

(75) Inventors: Willi Meyer, Effretikon (CH); Thomas Mueller, Cham (CH)

(73) Assignee: Emhart Glass S.A., Cham (CH)

( * ) Notice: Subject to any disclaimer, the term of this patent is extended or adjusted under 35 U.S.C. 154(b) by 367 days.

(21) Appl. No.: 10/424,449

(22) Filed: Apr. 28, 2003

(65) Prior Publication Data

US 2004/0211220 A1 Oct. 28, 2004

(51) Int. Cl.
*C03B 9/38* (2006.01)
*C03B 11/12* (2006.01)

(52) U.S. Cl. .............................. 65/356; 65/359; 65/361
(58) Field of Classification Search ................ 65/356, 65/359, 361
See application file for complete search history.

(56) References Cited

U.S. PATENT DOCUMENTS

| 3,586,491 | A | * | 6/1971 | Mennitt | 65/265 |
|---|---|---|---|---|---|
| 4,070,174 | A | * | 1/1978 | Nebelung et al. | 65/229 |
| 4,388,099 | A | * | 6/1983 | Hermening et al. | 65/267 |
| 4,690,703 | A | * | 9/1987 | Kulig | 65/265 |
| 4,983,203 | A | * | 1/1991 | Erb et al. | 65/265 |
| 5,059,236 | A | * | 10/1991 | Ito | 65/319 |
| RE34,048 | E | * | 9/1992 | Bolin | 65/265 |
| 5,330,551 | A | * | 7/1994 | Bolin | 65/265 |
| 5,358,542 | A | * | 10/1994 | Johnson et al. | 65/265 |
| 5,364,437 | A | * | 11/1994 | Bolin | 65/265 |
| 5,516,352 | A | * | 5/1996 | Bogert et al. | 65/265 |
| 5,569,313 | A | * | 10/1996 | Meyer | 65/359 |
| 5,766,299 | A | * | 6/1998 | Miller | 65/261 |

FOREIGN PATENT DOCUMENTS

EP 0425182 5/1991

* cited by examiner

*Primary Examiner*—Sean Vincent
(74) *Attorney, Agent, or Firm*—Spencer T. Smith

(57) ABSTRACT

A mold cooling system is disclosed for the blank mold halves of an I.S. machine. The mold halves are supported at their bottom by a lower hanger assembly which includes a discrete plenum for each of the mold halves. Each plenum is isolated and has its own air supply which includes an adjustable flow control. This provides complete control of the mold cooling process.

3 Claims, 3 Drawing Sheets

MOLD SUPPORT MECHANISM FOR AN I.S. MACHINE

This invention relates to a mold mechanism at a blank station of an I.S. type glassware forming machine.

BACKGROUND OF THE INVENTION

In the production of glass containers by the press and blow method on the well known I S type machine, a gob of glass is provided to a blank or parison mold comprising two mold members or halves which are supported by a mold mechanism at a blank station of the machine, which mold members can be closed to form a mold cavity_ The glass in the mold cavity is pressed into the required shape of a parison by a plunger moving upwardly into the mold cavity, a lower portion of the glass being forced into a neck ring of the mold. The plunger is then withdrawn and the parison is carried by the neck ring away from the blank station and is transferred to a blow mold station where it is blown to the required shape. In the blow and blow method a gob of glass is provided to the parison mold and is then blown into the required shape of a parison. The shaped parison is again carried by a neckring away from the blank station to a blow mold station.

It is necessary to cool the parison mold and this is commonly done by providing the mold members with cooling passages extending axially therethrough from a lower end face to an upper end face of the mold member. Commonly, for reasons of space, the cooling air has been provided to the upper ends of these cooling passages, and has passed downwardly through the mold members, but this does impede access to the blank mold mechanism.

In I S machines as employed at present, the cooling applied to the two blank molds in a double gob machine does not differentiate between the two blank molds. This is in fact disadvantageous, as the two blank molds heat up to different extents and as a result the two parisons delivered to the blow molds are not in the same temperature condition as each other, which can lead to the formation of unsatisfactory containers.

GB 2151608 describes an arrangement for cooling the blank mold members at the blank station of a double gob IS machine in which air is supplied to a plenum chamber which is positioned over the upper portion of two adjacent blank mold members and from which air is supplied at substantially uniform pressure to upper ends of cooling passages extending axially through the two blank mold members. This arrangement has been successful in operation, particularly because the uniformity of the pressure of the air supplied to the axial cooling passages enables calculation of the cooling effect of the air, but as one plenum chamber supplies one mold member of each blank mold it is not possible to differentiate between the cooling of the two molds.

U.S. Pat. No. 4,388,099 describes an arrangement for cooling the blank mold members at the blank station of a double gob IS machine in which air is supplied through a series of throttle valves to a number of chambers each arranged to supply air to some of a number of cranked cooling passages which extend partially obliquely and partially axially through the two blank mold members. The cooling effect of the air in this arrangement is not readily calculable not only because adjustment of the throttle valves alters the air flow unpredictably, but also because air flow in such cranked passages is also irregular, and the success of the cooling system depends on ad hoc adjustments of the various throttle valves.

OBJECT OF THE INVENTION

It is accordingly an object of the present invention to provide a cooling system for the blank s of an I.S. machine which will allow individual control of each of the blank mold halves.

BRIEF DESCRIPTION OF THE DRAWNGS

DETAILED DESCRIPTION OF THE PREFERRED EMBODIMENT

Figure 1:
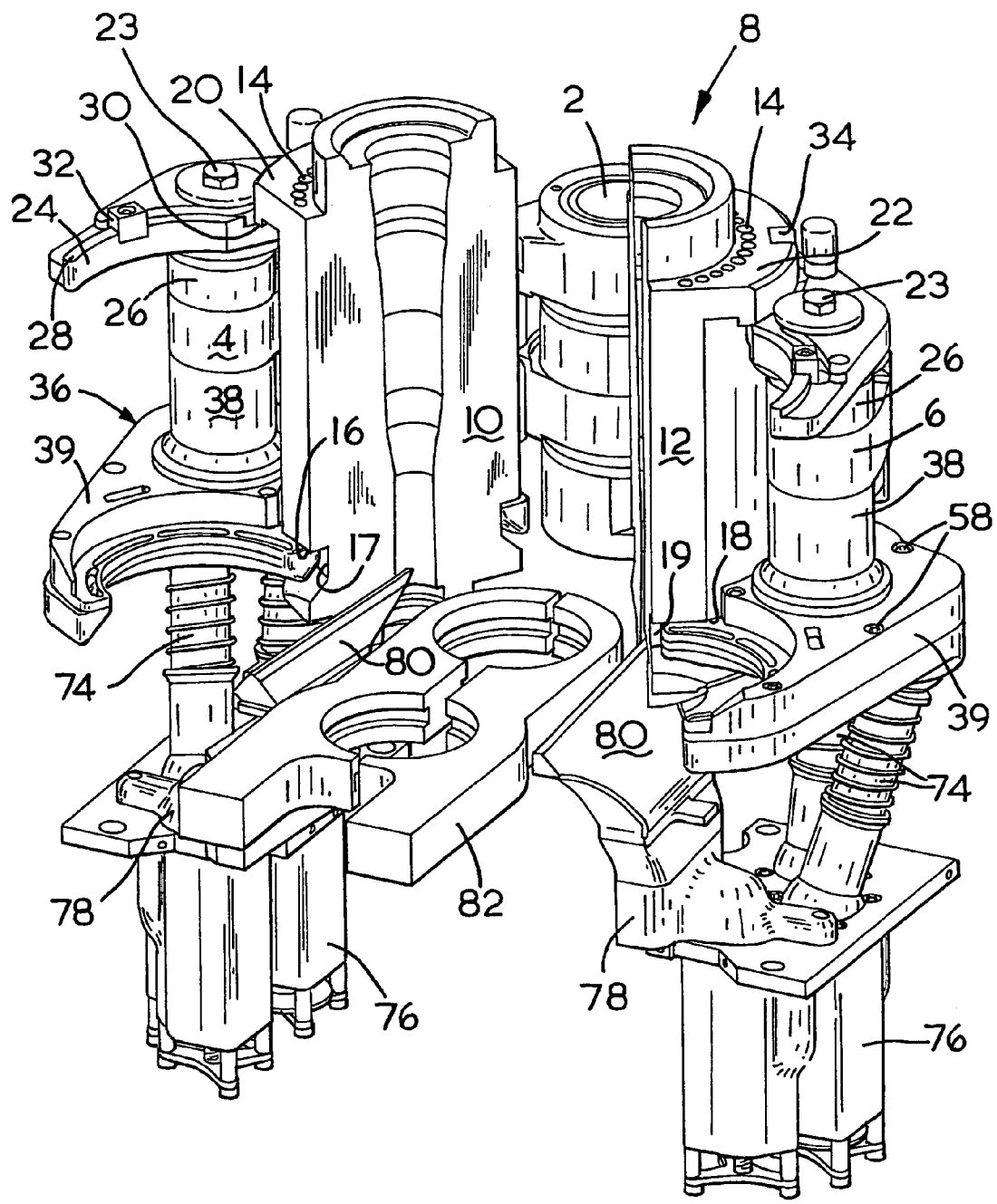
FIG. 1 shows a mold mechanism at a blank station of a double gob glassware forming machine with some parts omitted and with a pair of mold halves in the mechanism.
Figure 2:
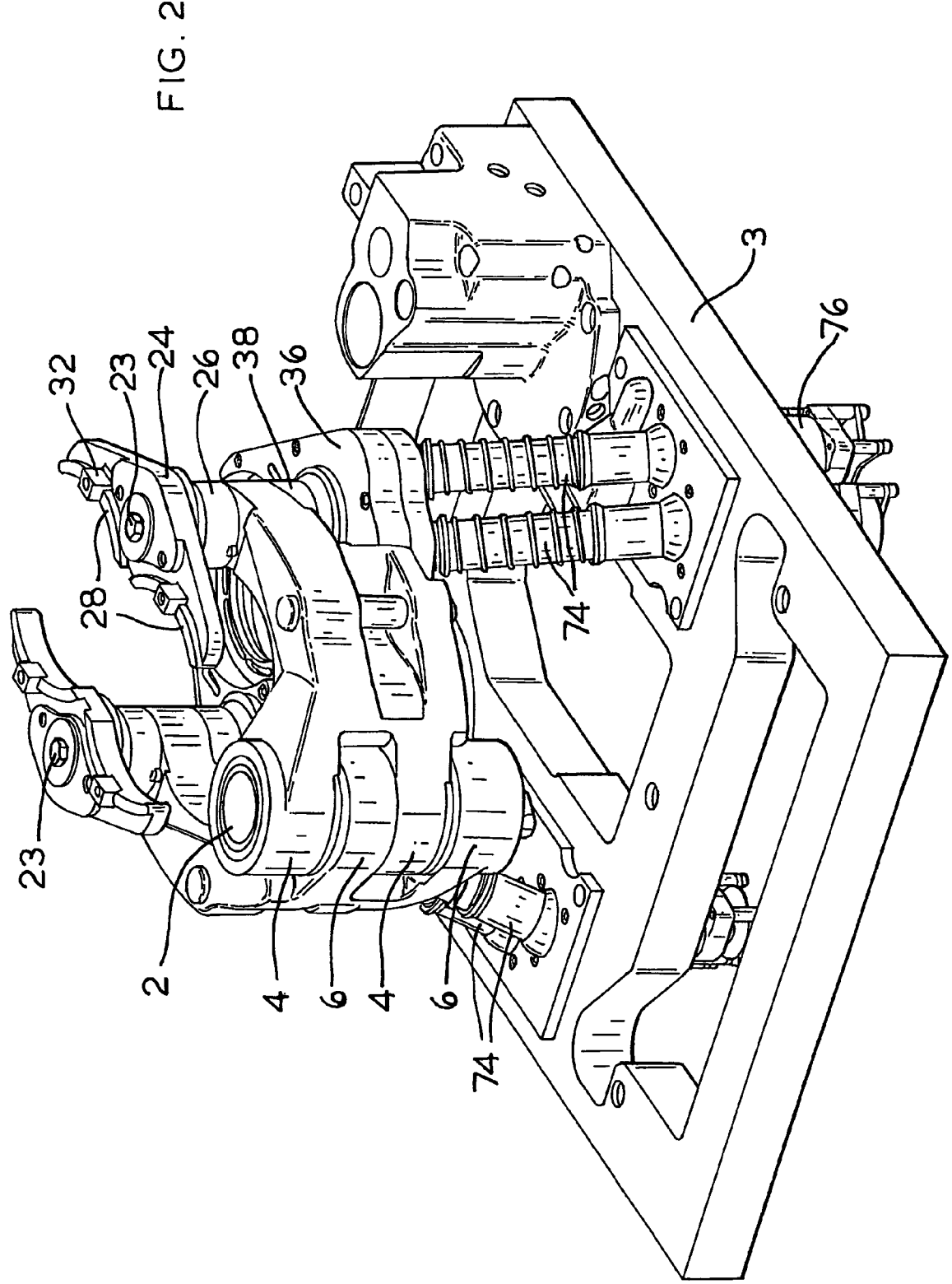
FIG. 2 shows a view similar to FIG. 1 but viewed from the other side of the mold mechanism.
Figure 3:
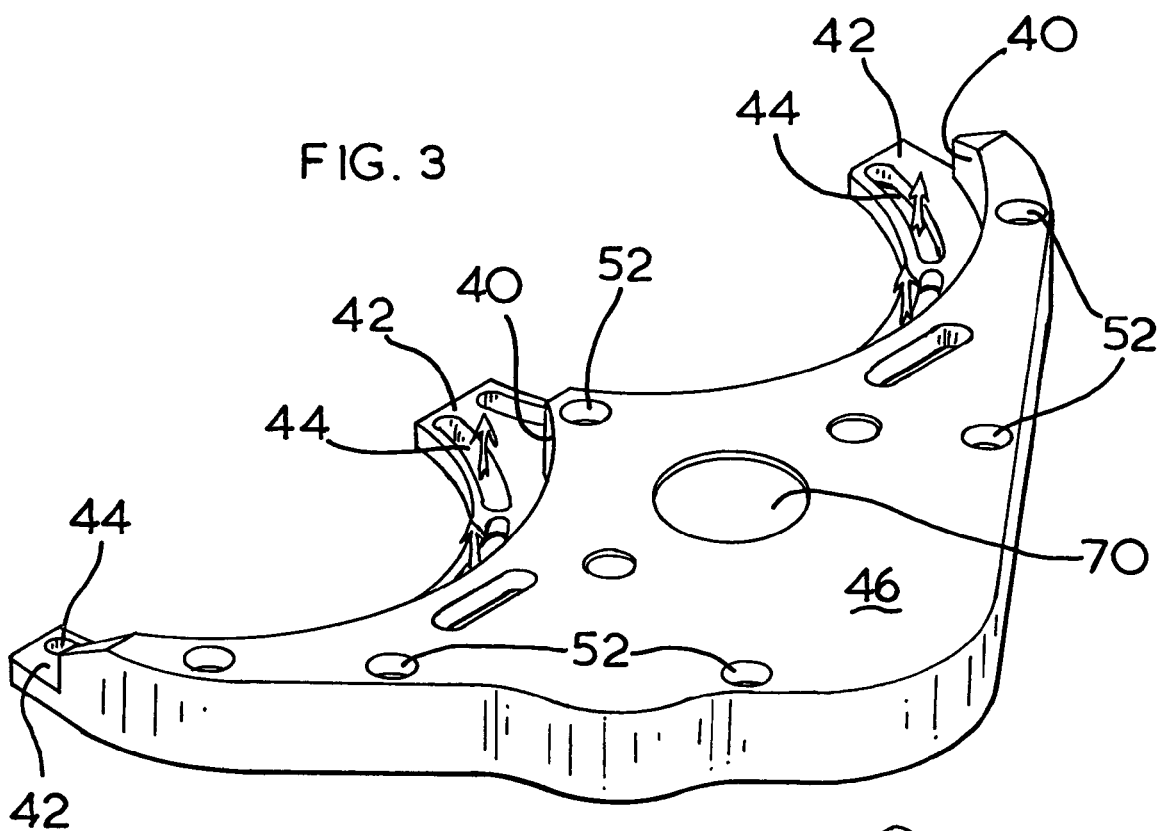
FIG. 3 shows a view of an upper portion of an air chamber member.
Figure 4:
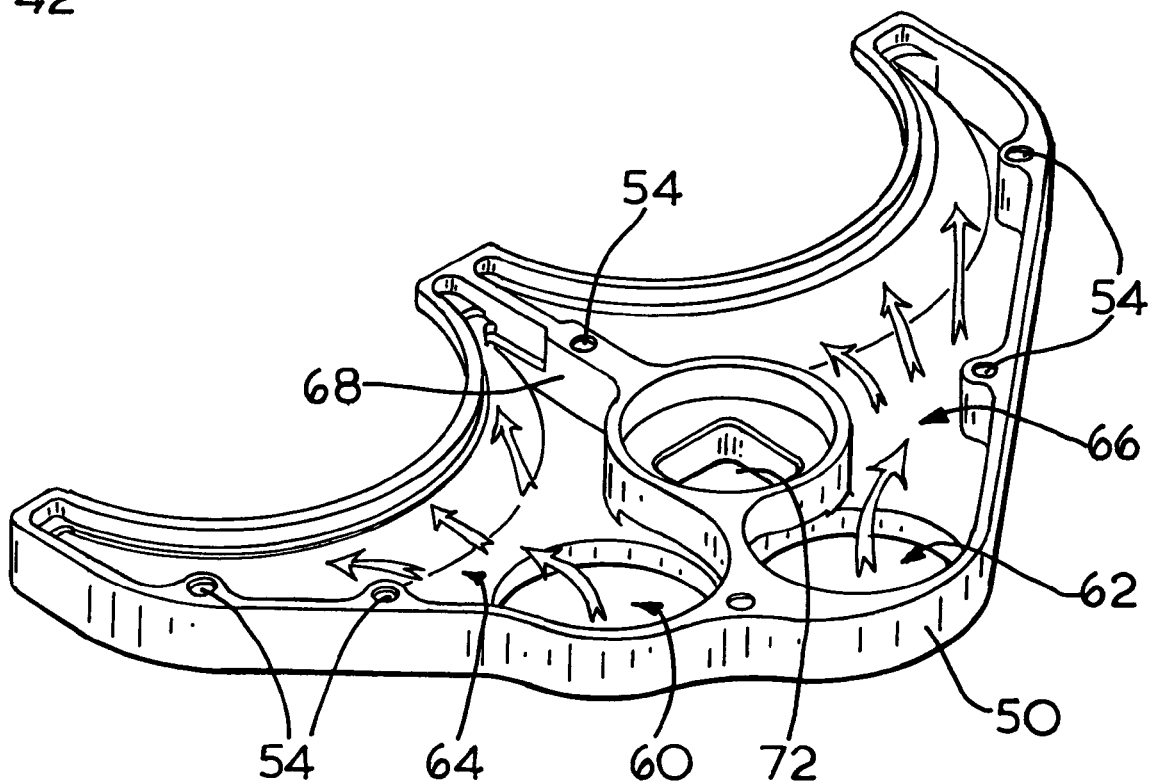
FIG. 4 shows a view of a lower portion of an air chamber member.

A multi gob glassware forming machine, specifically a double gob machine comprises a mold mechanism, FIGS. 1 & 2, mounted on a table 3 of the machine at a blank station of the machine. The mold mechanism comprises a pivot 2 fixed in the machine and two mold arms 4,6, mounted on the pivot 2 and adapted to support two blank molds, only one, 8, of which is shown in an open condition in FIG. 1. The blank mold 8 comprises two mold members 10,12, which are generally cylindrical in shape and each of which has straight cooling passages 14 extending axially through the mold member from a lower end face 16,18 to an upper end face 20, 22 of the mold members. It can be seen that the lower end faces 16, 18 bound a recess 17, 19 extending round an outer face of a lower end portion of the mold members, and the cooling passages 14 open into the recesses 17, 19 when the mold members are in position. It will be understood that the mechanism illustrated is adapted to have two blank molds, i.e. four mold members, and that the mold members are all similar as are the means for supporting the mold members in the mold mechanism. While the open and close mechanism is illustrated in the double gob configuration, it could also be single or double gob.

The mold arm 4 supports, on a generally vertical support rod 23, an upper mold support 24, and a spacer 26 which determines the height of the upper mold support 24 with respect to the mold arm 4. The upper mold support 24 comprises two curved ridges 28, only one of which can be seen in FIG. 1. The corresponding hook or curved ridge 30 on the member will be located behind the curved ridge when the mold is in place. A block 32 secured to the support 24 engages with a corresponding slot (shown at 34 on the mold member 12) in the mold member 10 accurately to locate the mold member 10 in position on the support 24.

The mold arm 4 also supports on the rod 23 a lower mold support 36 and a spacer 38 between the mold support 36 and the arm 4 which determines the height of the lower mold support 36 with respect to the mold arm 4. The lower mold support 36 defines an air plenum chamber 39 for the supported mold halves and serves not only to supply cooling air to the mold supported mold half but also to vertically locate the lower end portion of the mold member. The air chamber member 39 comprises an upper member 46 and a lower member 50 secured together by bolts 58 through holes 52 in the member 46 and 54 in the member 50. The lower member 50 is recessed and comprises two air inlets 60 and 62. The inlet 60 leads into a recess 64, the inlet 62 leads into a recess 66 separated from the recess 64 by a wall 68. The two members 46 and 50 when secured together provide two plenum chambers. In a plenum chamber, the entry to the chamber is sufficiently spaced from the exits to the chamber that a substantially uniform pressure is provided at the exits. The upper member 46 comprises two generally semicircular vertical surfaces 40 which are to be proximate the side wall of a supported mold. These vertical surfaces 40 are adjacent two horizontal supporting surfaces 42. The surfaces 42 are flat and generally semicircular in plan and have a series of curved apertures 44 formed in them which open into the plenum chambers formed by the recesses 64 and 66 and which are adapted to correspond with the cooling passages of the mold members, i.e. the passages 14 of the mold member 10 opening into the end face 16. The chamber member 39 enters the recess 17, the bottom surface or face 16 engages the horizontal support surface 42, and the vertical surfaces 40 engage the outer circumference of the mold member. The apertures 44 are positioned so that they will be in communication with the lower ends of the cooling passages in the mold member. The mold is supported vertically at the bottom of the mold where the horizontal bottom surface of the mold 16 rests on the horizontal supporting surface of the upper portion 46 of the lower support.

The upper member 46 has an aperture 70 which meets a corresponding aperture 72 in the lower member 50, and the support rod 23 passes through the apertures 70 and 72 to support the chamber member 39 against the spacer 38. The inlets 60,62 to each plenum chamber are connected by flexible air supply tubes 74 to air control cylinders 76. Another air control cylinder 76 (not clearly shown) also support a manifold 78 which is also connected to a neck-ring cooling head 80 which directs cooling air onto a neck-ring mechanism 82 of the parison forming mechanism (only shown diagrammatically.)

The mechanism according to the invention offers improved control over mold cooling. An independently adjustable air control cylinder 76 (the control cylinder has a settable valve) controls the supply of cooling air to the neck-ring cooling and to each of the plenum chambers independently.

Each air control cylinder has a settable valve (either manually or electronically operable) and accordingly, each control valve is independently adjustable.

The invention claimed is:

1. A multi-gob I.S. glassware forming machine comprising a mold open and close mechanism at each blank station of the machine including an opposed pair of mold holders selectively displaceable between open and closed positions, each of said mold holders having upper and lower hangars for supporting a plurality of mold halves each having vertically extending cooling air passages communicating with an annular horizontal bottom surface of the mold half, the lower hanger comprising a discrete air plenum for each of the supported mold halves, and each plenum having a series of upwardly facing apertures adapted to communicate with the cooling passages of the supported mold half, and a discrete corresponding plurality of air supply means for supplying cooling air to said plurality of discrete air plenums, each of said discrete air supply means including an adjustable flow volume control for controlling the cooling air supplied to the discrete air plenum.

2. A multi-gob I.S. glassware forming machine according to claim 1, wherein each of said independently adjustable volume controls is an air control cylinder and wherein each of said discrete air supply means further includes a flexible air supply tube interconnecting the associated plenum chamber and air control cylinder.

3. A multi-gob I.S. glassware forming machine according to claim 2, wherein said lower hanger further comprises an upper member and a lower member and wherein said discrete air plenums are defined between said upper and lower members.

* * * * *